(12) United States Patent
Bonabeau

(10) Patent No.: US 8,423,323 B2
(45) Date of Patent: Apr. 16, 2013

(54) SYSTEM AND METHOD FOR AIDING PRODUCT DESIGN AND QUANTIFYING ACCEPTANCE

(75) Inventor: Eric Bonabeau, Winchester, MA (US)

(73) Assignee: Icosystem Corporation, Cambridge, MA (US)

( * ) Notice: Subject to any disclaimer, the term of this patent is extended or adjusted under 35 U.S.C. 154(b) by 725 days.

(21) Appl. No.: 11/534,035

(22) Filed: Sep. 21, 2006

(65) Prior Publication Data
US 2007/0067212 A1 Mar. 22, 2007

Related U.S. Application Data

(60) Provisional application No. 60/719,024, filed on Sep. 21, 2005.

(51) Int. Cl.
*G06F 17/30* (2006.01)
(52) U.S. Cl.
USPC ............ 703/1; 705/7.32; 705/14.66; 707/600
(58) Field of Classification Search .................. 703/1, 2; 705/10, 26; 707/6
See application file for complete search history.

(56) References Cited

U.S. PATENT DOCUMENTS

| | | | |
|---|---|---|---|
| 4,700,295 A | 10/1987 | Katsof et al. | |
| 4,796,194 A | 1/1989 | Atherton | |
| 4,935,877 A | 6/1990 | Koza | |
| 5,041,972 A * | 8/1991 | Frost | 705/10 |
| 5,136,686 A | 8/1992 | Koza | |
| 5,148,513 A | 9/1992 | Koza et al. | |
| 5,181,259 A * | 1/1993 | Rorvig | 382/225 |
| 5,195,172 A | 3/1993 | Elad et al. | |
| 5,231,778 A | 8/1993 | Belobraydich et al. | |
| 5,233,513 A | 8/1993 | Doyle | |
| 5,428,712 A | 6/1995 | Elad et al. | |
| 5,438,782 A | 8/1995 | Belobraydich et al. | |
| 5,465,221 A | 11/1995 | Merat et al. | |
| 5,541,835 A | 7/1996 | Dextraze et al. | |

(Continued)

FOREIGN PATENT DOCUMENTS

| | | |
|---|---|---|
| EP | 1235180 | 8/2002 |
| EP | 1782285 | 5/2007 |

(Continued)

OTHER PUBLICATIONS

J. Wang, P. Luh, X. Zhao and J. Wang, "An Optimization-Based Algorithm for Job Shop Scheduling", Apr. 1997.*

(Continued)

*Primary Examiner* — Saif Alhija
*Assistant Examiner* — Kibrom Gebresilassie
(74) *Attorney, Agent, or Firm* — Morse, Barnes-Brown & Pendleton, P.C.; Sean D. Detweiler, Esq.

(57) ABSTRACT

Methods and systems for designing new products such as perfumes comprise having existing products in a product field rated according to product attributes; assigning each of the existing products a location in a multi-dimensional space according to the ratings; locating the existing products in a second multi-dimensional space; choosing reference products, which sample the second space, from among the existing products; having a consumer survey of the reference products conducted; creating a map of consumer responses in the second multi-dimensional space; and designing the new product based on the map of consumer responses.

48 Claims, 4 Drawing Sheets

U.S. PATENT DOCUMENTS

| | | | |
|---|---|---|---|
| 5,568,590 A | 10/1996 | Tolson | |
| 5,581,657 A | 12/1996 | Lyon | |
| 5,617,510 A | 4/1997 | Keyrouz et al. | |
| 5,708,774 A | 1/1998 | Boden | |
| 5,737,581 A | 4/1998 | Keane | |
| 5,761,381 A | 6/1998 | Arci et al. | |
| 5,761,494 A | 6/1998 | Smedley et al. | |
| 5,793,931 A | 8/1998 | Hillis | |
| 5,799,304 A | 8/1998 | Miller | |
| 5,809,489 A | 9/1998 | Davidor et al. | |
| 5,855,015 A | 12/1998 | Shoham | |
| 5,858,462 A | 1/1999 | Yamazaki et al. | |
| 5,864,633 A | 1/1999 | Opsal et al. | |
| 5,867,397 A | 2/1999 | Koza et al. | |
| 5,890,133 A | 3/1999 | Ernst et al. | |
| 5,890,146 A | 3/1999 | Wavish et al. | |
| 5,897,629 A | 4/1999 | Shinagawa et al. | |
| 5,930,780 A | 7/1999 | Hughes et al. | |
| 5,963,447 A | 10/1999 | Kohn et al. | |
| 5,963,939 A | 10/1999 | McCann et al. | |
| 5,970,487 A | 10/1999 | Shackleford et al. | |
| 5,978,507 A | 11/1999 | Shackleton et al. | |
| 5,987,457 A | 11/1999 | Ballard | |
| 6,029,139 A | 2/2000 | Cunningham et al. | |
| 6,055,523 A | 4/2000 | Hillis | |
| 6,088,690 A | 7/2000 | Gounares et al. | |
| 6,094,652 A | 7/2000 | Faisal | |
| 6,098,059 A | 8/2000 | Nordin et al. | |
| 6,125,351 A | 9/2000 | Kauffman | |
| 6,148,274 A | 11/2000 | Watanabe et al. | |
| 6,185,548 B1 | 2/2001 | Schwartz et al. | |
| 6,236,955 B1 | 5/2001 | Summers | |
| 6,249,714 B1 | 6/2001 | Hocaoglu et al. | |
| 6,253,200 B1 | 6/2001 | Smedley et al. | |
| 6,282,527 B1 | 8/2001 | Gounares et al. | |
| 6,321,205 B1 | 11/2001 | Eder | |
| 6,327,582 B1 | 12/2001 | Worzel | |
| 6,336,110 B1 | 1/2002 | Tamura et al. | |
| 6,349,238 B1 | 2/2002 | Gabbita et al. | |
| 6,353,825 B1 | 3/2002 | Ponte | |
| 6,408,263 B1 | 6/2002 | Summers | |
| 6,411,373 B1 | 6/2002 | Garside et al. | |
| 6,424,358 B1 | 7/2002 | DiDomizio et al. | |
| 6,430,545 B1 | 8/2002 | Honarvar et al. | |
| 6,434,435 B1 | 8/2002 | Tubel et al. | |
| 6,434,492 B1 | 8/2002 | Pollack et al. | |
| 6,434,542 B1 | 8/2002 | Farmen et al. | |
| 6,449,761 B1 | 9/2002 | Greidinger et al. | |
| 6,468,770 B1 | 10/2002 | Keyes et al. | |
| 6,480,832 B2 | 11/2002 | Nakisa et al. | |
| 6,484,166 B1 | 11/2002 | Maynard | |
| 6,490,566 B1 | 12/2002 | Schmidt | |
| 6,496,816 B1 * | 12/2002 | Thiesson et al. | 706/52 |
| 6,513,024 B1 | 1/2003 | Li | |
| 6,523,016 B1 | 2/2003 | Michalski | |
| 6,528,715 B1 | 3/2003 | Gargi | |
| 6,571,282 B1 | 5/2003 | Bowman-Amuah | |
| 6,576,919 B1 | 6/2003 | Yoshida et al. | |
| 6,636,848 B1 | 10/2003 | Aridor et al. | |
| 6,662,167 B1 | 12/2003 | Xiao | |
| 6,671,628 B2 | 12/2003 | Hurst | |
| 6,678,618 B1 | 1/2004 | Schwartz et al. | |
| 6,709,330 B1 | 3/2004 | Klein et al. | |
| 6,718,363 B1 | 4/2004 | Ponte | |
| 6,721,647 B1 | 4/2004 | Kita et al. | |
| 6,741,959 B1 | 5/2004 | Kaiser | |
| 6,745,184 B1 | 6/2004 | Choi et al. | |
| 6,760,335 B1 | 7/2004 | Andersson et al. | |
| 6,763,354 B2 | 7/2004 | Hosken et al. | |
| 6,848,104 B1 | 1/2005 | Van Ee et al. | |
| 6,865,571 B2 | 3/2005 | Inaba et al. | |
| 6,868,525 B1 * | 3/2005 | Szabo | 715/738 |
| 6,882,988 B2 | 4/2005 | Subbu et al. | |
| 6,895,286 B2 | 5/2005 | Kaji et al. | |
| 6,895,396 B2 | 5/2005 | Schwartz et al. | |
| 6,895,405 B1 | 5/2005 | Choi et al. | |
| 6,904,335 B2 | 6/2005 | Solomon | |
| 6,912,587 B1 | 6/2005 | O'Neil | |
| 6,928,434 B1 | 8/2005 | Choi et al. | |
| 6,934,405 B1 | 8/2005 | Schuessler et al. | |
| 6,937,993 B1 | 8/2005 | Gabbita et al. | |
| 6,941,287 B1 | 9/2005 | Vaidyanathan et al. | |
| 6,941,321 B2 | 9/2005 | Schuetze et al. | |
| 6,947,844 B2 | 9/2005 | Steitz et al. | |
| 6,947,845 B2 | 9/2005 | Steitz et al. | |
| 6,947,930 B2 | 9/2005 | Anick et al. | |
| 6,950,270 B2 | 9/2005 | Lyle et al. | |
| 6,950,712 B2 | 9/2005 | Ulyanov et al. | |
| 6,952,650 B2 | 10/2005 | Steitz et al. | |
| 6,952,700 B2 | 10/2005 | Modha et al. | |
| 6,957,200 B2 | 10/2005 | Buczak et al. | |
| 6,996,560 B1 | 2/2006 | Choi et al. | |
| 7,000,700 B2 | 2/2006 | Cairns et al. | |
| 7,003,504 B1 | 2/2006 | Angus et al. | |
| 7,003,516 B2 | 2/2006 | Dehlinger et al. | |
| 7,003,560 B1 | 2/2006 | Mullen et al. | |
| 7,007,006 B2 | 2/2006 | Zilio et al. | |
| 7,013,238 B1 | 3/2006 | Weare | |
| 7,035,740 B2 | 4/2006 | Kermani | |
| 7,043,463 B2 * | 5/2006 | Bonabeau et al. | 706/13 |
| 7,047,169 B2 | 5/2006 | Pelikan et al. | |
| 7,070,647 B2 | 7/2006 | Fujimori et al. | |
| 7,076,475 B2 | 7/2006 | Honarvar | |
| 7,092,378 B1 | 8/2006 | O'Neil | |
| 7,110,888 B1 | 9/2006 | Nicholls | |
| 7,117,202 B1 | 10/2006 | Willoughby | |
| 7,127,695 B2 | 10/2006 | Huang et al. | |
| 7,139,665 B2 | 11/2006 | Datta et al. | |
| 7,181,438 B1 * | 2/2007 | Szabo | 1/1 |
| 7,190,116 B2 | 3/2007 | Kobayashi et al. | |
| 7,191,164 B2 | 3/2007 | Ray et al. | |
| 7,194,461 B2 | 3/2007 | Kawatani | |
| 7,280,986 B2 | 10/2007 | Goldberg et al. | |
| 7,318,057 B2 | 1/2008 | Aridor et al. | |
| 7,333,960 B2 | 2/2008 | Bonabeau et al. | |
| 7,356,518 B2 | 4/2008 | Bonabeau et al. | |
| 7,457,678 B2 | 11/2008 | Smith et al. | |
| 7,461,059 B2 | 12/2008 | Richardson et al. | |
| 7,475,027 B2 * | 1/2009 | Brand | 705/26 |
| 7,491,494 B2 | 2/2009 | Liu et al. | |
| 7,496,597 B2 * | 2/2009 | Rising, III | 1/1 |
| 7,593,905 B2 | 9/2009 | He | |
| 7,603,325 B2 | 10/2009 | Jacobson | |
| 7,603,326 B2 | 10/2009 | Bonabeau et al. | |
| 7,624,077 B2 | 11/2009 | Bonabeau et al. | |
| 7,664,094 B1 | 2/2010 | O'Neil | |
| 7,707,220 B2 | 4/2010 | Bonabeau et al. | |
| 7,882,048 B2 | 2/2011 | Bonabeau et al. | |
| 7,966,272 B2 | 6/2011 | Bonabeau et al. | |
| 8,014,436 B2 * | 9/2011 | Dent | 375/141 |
| 8,131,732 B2 * | 3/2012 | Yu et al. | 707/748 |
| 8,301,574 B2 * | 10/2012 | Kilger et al. | 705/306 |
| 2001/0003824 A1 | 6/2001 | Schnier | |
| 2002/0073065 A1 | 6/2002 | Inaba et al. | |
| 2002/0073079 A1 | 6/2002 | Terheggen | |
| 2002/0083031 A1 | 6/2002 | De Varax | |
| 2002/0091661 A1 | 7/2002 | Anick et al. | |
| 2002/0138481 A1 | 9/2002 | Aggarwal et al. | |
| 2002/0156773 A1 | 10/2002 | Hildebrand et al. | |
| 2002/0161747 A1 | 10/2002 | Li et al. | |
| 2002/0165703 A1 | 11/2002 | Olhofer et al. | |
| 2002/0165859 A1 * | 11/2002 | Iyengar et al. | 707/5 |
| 2002/0174101 A1 | 11/2002 | Fernley et al. | |
| 2002/0174126 A1 | 11/2002 | Britton et al. | |
| 2003/0033287 A1 | 2/2003 | Shanahan et al. | |
| 2003/0041042 A1 * | 2/2003 | Cohen et al. | 706/45 |
| 2003/0051240 A1 * | 3/2003 | Schaffer et al. | 725/34 |
| 2003/0055614 A1 * | 3/2003 | Pelikan et al. | 703/2 |
| 2003/0061096 A1 * | 3/2003 | Gallivan et al. | 705/14 |
| 2003/0069873 A1 | 4/2003 | Fox et al. | |
| 2003/0088458 A1 * | 5/2003 | Afeyan et al. | 705/10 |
| 2003/0187950 A1 | 10/2003 | Rising | |
| 2004/0010479 A1 | 1/2004 | Ali | |
| 2004/0030414 A1 | 2/2004 | Koza et al. | |
| 2004/0053690 A1 | 3/2004 | Fogel et al. | |
| 2004/0063604 A1 * | 4/2004 | Behan et al. | 512/5 |
| 2004/0081977 A1 | 4/2004 | Hsu et al. | |

| | | | |
|---|---|---|---|
| 2004/0117333 | A1 | 6/2004 | Voudouris et al. |
| 2004/0117355 | A1 | 6/2004 | Lef et al. |
| 2004/0117402 | A1* | 6/2004 | Tateson et al. ............ 707/104.1 |
| 2004/0122798 | A1 | 6/2004 | Lin et al. |
| 2004/0133355 | A1 | 7/2004 | Schneider |
| 2004/0139058 | A1 | 7/2004 | Gosby et al. |
| 2004/0162738 | A1 | 8/2004 | Sanders et al. |
| 2004/0172202 | A1 | 9/2004 | Sidorowich |
| 2004/0186827 | A1 | 9/2004 | Anick et al. |
| 2004/0204957 | A1* | 10/2004 | Afeyan et al. ..................... 705/1 |
| 2004/0243388 | A1 | 12/2004 | Corman et al. |
| 2004/0254901 | A1 | 12/2004 | Bonabeau et al. |
| 2005/0005232 | A1 | 1/2005 | Gosby |
| 2005/0010553 | A1 | 1/2005 | Liu |
| 2005/0118612 | A1 | 6/2005 | Bonabeau et al. |
| 2005/0119983 | A1 | 6/2005 | Bonabeau et al. |
| 2005/0131884 | A1 | 6/2005 | Gross et al. |
| 2005/0165763 | A1 | 7/2005 | Li et al. |
| 2005/0177280 | A1 | 8/2005 | Almstetter et al. |
| 2005/0187926 | A1 | 8/2005 | Britton et al. |
| 2005/0198026 | A1 | 9/2005 | Dehlinger et al. |
| 2005/0261953 | A1 | 11/2005 | Malek et al. |
| 2005/0288990 | A1* | 12/2005 | Ballou et al. ................... 705/10 |
| 2006/0010117 | A1 | 1/2006 | Bonabeau et al. |
| 2006/0010126 | A1 | 1/2006 | Anick et al. |
| 2006/0122861 | A1 | 6/2006 | Scott et al. |
| 2006/0167862 | A1 | 7/2006 | Reisman |
| 2006/0167896 | A1 | 7/2006 | Kapur et al. |
| 2006/0184521 | A1 | 8/2006 | Ponte |
| 2006/0195325 | A1 | 8/2006 | Tateson et al. |
| 2006/0248044 | A1 | 11/2006 | Zhang et al. |
| 2007/0027830 | A1 | 2/2007 | Simons et al. |
| 2007/0067212 | A1 | 3/2007 | Bonabeau et al. |
| 2007/0156677 | A1 | 7/2007 | Szabo |
| 2007/0192263 | A1 | 8/2007 | Zhu |
| 2007/0244870 | A1 | 10/2007 | Laurent et al. |
| 2007/0298866 | A1 | 12/2007 | Bonabeau et al. |
| 2008/0021855 | A1 | 1/2008 | Bonabeau et al. |
| 2008/0040671 | A1 | 2/2008 | Reed |
| 2008/0055049 | A1 | 3/2008 | Weill et al. |
| 2008/0109420 | A1 | 5/2008 | Britton et al. |
| 2008/0172261 | A1* | 7/2008 | Albertson et al. ................ 705/7 |
| 2008/0255024 | A1* | 10/2008 | Behan et al. ....................... 512/4 |
| 2009/0018996 | A1* | 1/2009 | Hunt et al. ......................... 707/2 |
| 2009/0228328 | A1* | 9/2009 | Cagan et al. ..................... 705/10 |
| 2010/0002751 | A1* | 1/2010 | Dent ............................. 375/141 |
| 2010/0199186 | A1 | 8/2010 | Bonabeau et al. |
| 2010/0211558 | A1 | 8/2010 | Bonabeau et al. |
| 2011/0004578 | A1* | 1/2011 | Momma et al. .................. 706/12 |
| 2011/0137839 | A1 | 6/2011 | Bonabeau et al. |
| 2011/0258137 | A1* | 10/2011 | Pasta ............................. 705/347 |
| 2012/0116841 | A1* | 5/2012 | Bippert et al. ................ 705/7.31 |
| 2012/0116842 | A1* | 5/2012 | Bippert et al. ................ 705/7.31 |
| 2012/0271785 | A1* | 10/2012 | Albertson et al. ............. 706/46 |

FOREIGN PATENT DOCUMENTS

| | | |
|---|---|---|
| WO | WO 95/16977 | 6/1995 |
| WO | WO 00/02136 | 1/2000 |
| WO | WO 00/02138 | 1/2000 |
| WO | WO 00/54185 | 9/2000 |
| WO | WO 02/27541 | 4/2002 |
| WO | WO 2006/014454 | 2/2006 |

OTHER PUBLICATIONS

Cordon et al., "Evolutionary Learning of Boolean Queries by Multiobjective Genetic programming", springer-Verlag Berlin Heidelberg 2002, pp. 710-719, accessed online at <http://www.springerlink.com/content/1k1yyxfp7c4tq4he/fulltext.pdf> on Nov. 25, 2008.
Horng et al., "Applying Genetic Algorithms to Query Optimization in Document Retrieval", Information Processing and Management 36: 2000, pp. 737-759, Accessed Online at <http://www.sciencedirect.com/science>, on Nov. 25, 2008.
Pathak et al., "Effective Information Retrieval using Genetic Algorithms based Matching Functions Adaptation", Proceeding of the 33rd Hawaii International Conference on System Sciences, IEEE: 2000, pp. 1-8, Accessed online at <http://citeseerx.inst.psu.edu/viewdoc/summary?doi+10.1.1.104.1413> on Nov. 25, 2008.
International Search Report for PCT/US2007/072101.
Supplementary European search report for Application No. EP 04 74 9609.
Supplementary European search report for Application No. EP 04 78 2505.
Bentley, P. J. et al "New Trends in Evolutionary Computation", *Evolutionary Computation*, 2001. Proceedings of the 2001 Congress on May 27-30, 2001 Piscataway, NJ, USA, IEEE, vol. 1, pp. 162-169.
Kosorukoss, Alex , "Human Based Genetic Algorithm" 2001 IEEE International Conference on Systems Man and Cybernetics. SMC 2001. Tucson, AZ, Oct. 7-10, 2001; vol. 5, pp. 3464-3469.
Giacinto et al., "Instanced-based Relevance Feedback for Image Retrieval", 2004, pp. 1-8.
Klabbankoh et al., "Applied genetic Algorithms in Information Retrieval", 1999, pp. 1-6.
Kraft et al., "The Use of Genetic Programming to build queries for Information Retrieval", IEEE, 1994, pp. 468-473.
Lopez-Pujalte et al., "Genetic algorithms in relevance feedback: a second test and new contributions", Information Processing and Management, vol. 39, 2003, pp. 669-687.
MacArthur et al., "Relevance Feedback Decision Trees in Content-based Image Retrieval", Proceedings of the IEEE Workshop on Content-based Access of Image and Video Libraries, 2000, pp. 1-5.
Meilhac et al., "Relevance Feedback and Category Search in Image Databases", 1999 pp. 1-7.
Sciascio et al., "Content-based Image Retrieval over the Web using Query by Sketch and Relevance Feedback", Proceedings of 4th International Conference on Visual Information System, 1999, p. 123-130.
Smith et al., "The use of genetic programming to build Boolean queries for text retrieval through relevance feedback", Journal of Information Science, vol. 23, No. 6, 1997, pp. 423-431.
Stejic et al., "Genetic algorithm-based relevance feedback for image retrieval using local similarity patterns", Information Processing and Management, vol. 39, 2003, pp. 1-23.
Xin et al., "Relevance Feedback for Content-based Image Retrieval using Bayesian Network", The Pan-Sydney Area Workshop on Visual Information Processing, 2003, pp. 1-4.
Yang et al., "Query Optimization in Information retrieval Using Genetic Algorithms", Proceedings of the 5th International Conference on Genetic Algorithms, 1993, pp. 603-613.
Zhou et al., "Relevance feedback in image retrieval: A comprehensive review", Springer-Verlag 2003, pp. 536-544.
Tasoulis, D.K. et al. "The new window density function for efficient evolutionary unsupervised clustering" *Evolutionary Computation*, 2005. The 2005 IEEE congress on vol. 3, Sep. 2-5, 2005, p. 2388-2394.
International Search Report and Written Opinion for PCT/US04/24616.
Buchsbaum, D. et al "Designing Collective Behavior in a Group of Humans Using a Real-Time Polling System and Interactive Evolution", Swarm Intelligence Symposium, 2005. SIS 2005. Proceedings 2005 IEEE Jun. 8-10, 2005 Publication pp. 15-21 (Our pp. 1-13).
Trifonov, I., et al "Resource Allocation for a Distributed Sensor Network", Swarm Intelligence Symposium, 2005. SIS 2005. Proceedings 2005 IEEE Jun. 8-10, 2005 Publication pp. 428-431 (Our pp. 1-4).
Gaudiano, P. et al "Evolving Behaviors for a Swarm of Unmanned Air Vehicles", Swarm Intelligence Symposium, 2005. SIS 2005. Proceedings 2005 IEEE Jun. 8-10, 2005 Publication pp. 317-324 (Our pp. 1-6, 13, 14).
Anderson, C., et al "Modeling, Quantifying and Testing Complex Aggregate Service Chains", Web Services, 2005. ICWS 2005. Proceedings. 2005 IEEE International Conference on Jul. 11-15, 2005 Publication pp. 274-281 vol. 1 (Our pp. 1-8).
Funes, P., et al., "Interactive Multi-Participant Tour Allocation", Evolutionary Computation, 2004. CEC2004. Congress on vol. 2, Jun. 19-23, 2004 pp. 1699-1705 vol. 2.
Malinchik, S., "Interactive Exploratory Data Analysis", Evolutionary Computation, 2004. CEC2004. Congress on vol. 1, Jun. 19-23, 2004 pp. 1098-1104 vol. 1.

Anderson, C., et al., "Evolutionary Testing as Both a Testing and Redesign Tool: a Study of a Shipboard Firemain's Valve and Pump Controls", Evolution Computation, 2004. CEC2004. Congress on vol. 1, Jun. 19-23, 2004 pp. 1089-1097 vol. 1.

Ashburn, T., et al., "Interactive Inversion of Financial Markets Agent-Based Models", Evolutionary Computation, 2004. CEC 2004. Congress on vol. 1, Jun. 19-23, 2004 pp. 522-529 vol. 1.

Pollack, J., et al., "Coevolutionary Robotics" Evolvable Hardware, 1999. Proceedings of the First NASA/DoD Workshop on Jul. 19-21, 1999 pp. 208-216.

Kumar, R., et al., "Assessing the Convergence of Rank-Based Multiobjective Genetic Algorithms", Genetic Algorithms in Engineering Systems: Innovations and Applications, 1997. GALESIA 97. Second International Conference on (Conf. Publ. No. 446) Sep. 2-4, 1997 pp. 19-23.

Van Der Meche, E., "Nevanlinna-Pick Interpolation with Degree Constraint: Complete Parameterization Based on Lyapunov Inequalities", Decision and Control, 2004. CDC. 43rd IEEE Conference on vol. 1, Dec. 14-17, 2004 pp. 411-416 vol. 1.

Kaltofen, E., et al., "Processor-Efficient Parallel Solution of Linear Systems. II. The Positive Characteristic and Singular Cases" Foundations of Computer Science, 1992. Proceedings., 33rd Annual Symposium on Oct. 24-27, 1992 pp. 714-723.

De Moor, B., et al., "A Geometrical Approach to the Maximal Corank Problems in the Analysis of Linear Relations", Decision and Control, 1986 25th IEEE Conference on vol. 25, Part 1, Dec. 1986 pp. 1990-1995.

Linkens, D.A., et al. "A Distributed Genetic Algorithm for Multivariable Fuzzy Control", Genetic Algorithms for Control Systems Engineering, IEEE Colloquium on May 28, 1993 pp. 9/1-9/3.

Sakawa, M., et al., "An Interactive Fuzzy Satisficing Method for Multiobjective Nonconvex Programming Problems With Fuzzy Numbers Through Coevolutionary Genetic Algorithms" Systems, Man and Cybernetics, Part B, IEEE Transactions on vol. 31, Issue 3, Jun. 2001 pp. 459-467 Digital Object Identifier 10.1109/3477. 931546.

Hu Guoqiang, et al., "Multiobjective Optimization Scheduling Based on Fuzzy Genetic Algorithm in Cascaded Hydroelectric Stations", Transmission and Distribution Conference and Exhibition: Asia and Pacific, 2005 IEEE/PES 2005 p. 1-4 Digital Object Identifier 10.1109/TDC.2005.1547075.

Dasheng Liu, et al., "A Multiobjective Memetic Algorithm Based on Particle Swarm Optimization", Systems, Man and Cybernetics, Part B, IEEE Transactions on vol. 37, Issue 1, Feb. 2007 pp. 42-50 Digital Object Identifier 10. 1109/TSMCB.2006.883270.

Rodriguez-Vazquez, K. et al., "Multi-Objective Genetic Programming for Nonlinear System Identification", Electronics Letters vol. 34, Issue 9, Apr. 30, 1998 pp. 930-931.

Pu Han, et al., "A Multi-Objective Genetic Programming/NARMAX Approach to Chaotic Systems Identification", Intelligent Control and Automation, 2006. WCICA 2006. The Sixth World Congress on vol. 1, 2006 pp. 1735-1739 Digital Object Identifier 10.1109/WCICA. 2006.1712650.

Tan, K.C., et al., "Enhanced Distribution and Exploration for Multiobjective Evolutionary Algorithms", Evolutionary Computation, 2003. CEC '03. The 2003 Congress on vol. 4, Dec. 8-12, 2003 pp. 2521-2528 vol. 4 Digital Object Identifier 10.1109/CEC.2003. 1299405.

Maceachern, L.A., "Constrained Circuit Optimization Via Library Table Genetic Algorithms" Circuits and Systems, 1999. ISCAS '99. Proceedings of the 1999 IEEE International Symposium on vol. 6, May 30-Jun. 2, 1999 pp. 310-313 vol. 6 Digital Object Identifier 10.1109/ISCAS.1999.780157.

Carrano, E.G., et al., "Electric Distribution Network Multiobjective Design Using a Problem-Specific Genetic Algorithm", Power Delivery, IEEE Transactions on vol. 21, Issue 2, Apr. 2006 pp. 995-1005 Digital Object Identifier 10.1109/TPWRD.2005.858779.

Dong-Hyeok Cho, et al., "Multiobjective Optimal Design of Interior Permanent Magnet Synchronous Motors Considering Improved Core Loss Formula", IEEE Transactions on Energy Conversion, vol. 14, Issue 4, Dec. 1999 pp. 1347-1352 Digital Object Identifier 10.1109/60.815071.

Li-Cun Fang, et al., "Concurrent Optimization for Parameters of Powertrain and Control System of Hybrid Electric Vehicle Based on Multi-Objective Genetic Algorithms", SICE-ICASE, 2006. International Joint Conference Oct. 2006 p. 2424-2429 Digital Object Identifier 10.1109/SICE.2006.315114.

Kato, K., et al., "Large Scale Fuzzy Multiobjective 0-1 Programs Through Genetic Algorithms with Decomposition Procedures", Knowledge-Based Intelligent Electronic Systems, 1998. Proceedings KES '98. 1998 Second International Conference on vol. 1, Apr. 21-23, 1998 pp. 278-284 vol. 1 Digital Object Identifier 10.1109/ KES.1998.725859.

Esbensen, H., et al., "Design Space Exploration Using the Genetic Algorithm," Circuit and Systems, 1996. ISCAS '96., 'Connecting the World'., 1996 IEEE International Symposium on vol. 4, May 12-15, 1996 pp. 500-503 vol. 4 Digital Object Identifier 10.1109/ISCAS. 1996.542010.

Then, T.W., et al., "Genetic Algorithms in Noisy Environment", Intelligent Control, 1994., Proceedings of the 1994 IEEE International Symposium on Aug. 16-18, 1994 pp. 225-230 Digital Object Identifier 10.1109/ISIC.1994.367813.

Gopinath, D., et al., "An Integrated Methodology for Multiobjective Optimal Component Placement and Heat Sink Sizing", Components and Packaging Technologies, IEEE Transactions on [see also Components, Packaging and Manufacturing Technology, Part A: Packaging Technologies, IEEE Transactions on] vol. 28, Issue 4, Dec. 2005 p. 869-876.

Dong-Joon Sim, et al., "Application of Vector Optimization Employing Modified Genetic Algorithm to Permanent Magnet Motor Design", Magnetics, IEEE Transactions on vol. 33, Issue 2, part 2, Mar. 1997 p. 1888-1891 Digital Object Identifier 10.1109/20. 582654.

Ishibushi, H., et al., "Comparison Between Single-Objective and Multi-Objective Genetic Algorithms: Performance Comparison and Performance Measures", Evolutionary Computation, 2006. CEC 2006. IEEE Congress on Jul. 16-21, 2006 pp. 1143-1150.

Li Mingqiang, et al., "GA-Based Multi-Objective Optimization" Intelligent Control and Automation, 2000. Proceedings of the 3rd World Congress on vol. 1, Jun. 28-Jul. 2, 2000 p. 637-640 vol. 1 Digital Object Identifier 10.1109/WCICA.2000.860050.

Wang, Jihua et al., "An Optimization-Based Algorithm for Job Shop Scheduling," University of Connecticut, Dept. of Electrical Engineering Publishing, MSL Papers, Mar. 28, 2004, p. 10.

International Search Report and Written Opinion for PCT/US 06/36765.

Ronald, S., "Duplicate genotypes in a genetic algorithm," Evolutionary Computation Proceedings, 1998. IEEE World Congress on Computational Intelligence., The 1998 IEEE International Conference on May 4-9, 1998 pp. 793-798, Digital Object Identifier 10.1109/ICEC. 1998.700153.

Cranfield, et al., "Exposure of magnetic bacteria to simulated mobile phone-type RF radiation has no impact on mortality," Nanobioscience, IEEE Transactions on vol. 2, Issue 3, Sep. 2003 pp. 146-149, Digital Object Identifier 10.1009/TNB.2003.816227.

International Search Report and Written Opinion for PCT/US08/ 52780.

Using Semantic Graphs in Clustering Process: Enhance Information Level—Brunner, B; Berrien, I; Web Intellegence, 2004. WI 2004. Proceedings. IEEE/WIC/ACM International Conference on Sep. 20-24, 2004 pp. 221-227; Digital Object Identifier 10.1109/WI.2004. 10106.

Multiobjective genetic optimization of diagnostic classifiers with implications for generating receiver operating characteristic curves—Kupinski, MA.; Anastasio, M.A.; Medical Imaging, IEEE Transactions on vol. 18, Issue 8, Aug. 1999 pp. 675-685 Digital Object Identifier 10.1109/42.796281.

Robust optimal power control for ad hoc networks—Fridman, A.; Grote, R.; Weber, S.; Dandekar, K.R.; Kam, M.; Information Sciences and Systems, 2006 40th Annual Conference on Mar. 22-24, 2006 pp. 729-733 Digital Object Identifier 10.1109/CISS.2006. 286562.

Honma, Masaki et al., "Knowledge Refinement Approach through Incorporating Case-based Knowledge in Maintenance Engineer Scheduling Al System"; Systems, Man, and Cybernetics, 1999.

IEEE SMC '99 Conference Proceedings. 1999 IEEE International Conference on vol. 5, Oct. 12-15, 1999 pp. 814-819 vol. 5.
Ioannidis, Stratos et al. "Fuzzy Supervisory Control of Manufacturing Systems", Robotics and Automation, IEEE Transactions on vol. 20, Issue 3, Jun. 2004 pp. 379-389.
Tao, Yongcai et al., "Adaptive Multi-round Scheduling Strategy for Divisible Workloads in Grid Environments", Information Networking, 2009. ICOIN 2009. International Conference on Jan. 21-24, 2009 pp. 1-5.
Tsourveloudis, Nikos et al., "Work-in-Process Scheduling by Evolutionary Tuned Distributed Fuzzy Controllers", Robotics and Automation, 2006. ICRA 2006 IEEE International Conference on May 15-19, 2006 pp. 1420-1425.
International Search Report and Written Opinion for PCT/US09/42594.
Guanci, Yang et al.; "Sustainable Genetic Algorithms Basis of Relative Adaptation Strategy and Self-adaptive Learning Operator", 2008 International Symposium on Computational Intelligence and Design, pp. 225-228.
Luo, B. et al., *A World Wide Web Based Image Search Engine Using Text and Image Content Features*, Electronic Imaging, SPIE vol. 5018 (2003), pp. 123-130.
Matsui, K. et al.; "New Selection Method to Improve the Population Diversity in Genetic Algorithms"IEEE SMC '99 Conference Proceedings. 1999 IEEE International Conference, pp. 625-630 vol. 1.
Wu, P., et al., *Adaptive Nearest Neighbor Search for Relevance Feedback in Large Image Databases*, MM'01 Sep. 30-Oct. 5, 2001, pp. 89-97.
Wu, Yong-Gang et al.; "A Diploid Genetic Approach to Short-Term Scheduling of Hydro-Thermal System", IEEE Transactuions on Power Systems, vol. 15, No. 4, Nov. 2000, pp. 1268-1274.
Yang, Jun-Jie et al.; "A Hybrid Intelligent Messy Genetic Algorithm for Daily Generation Scheduling in Power System", Proceeding of the Third International Conference on Machine Learning and Cybernetics, Shanghai, Aug. 26-29, 2004, pp. 2217-2222, vol. 4.
Office Action for Japanese patent application 2006-524908.
Sheth et al., "Evolving Agents for Personalized Information Filtering", IEEE 1993, pp. 345-352.
Moriyama, et al., "Interactive Parallel Generic Algorithm and Its Characteristic of Convergence", 17th Fuzzy System Symposium, Japan, Sep. 2001.
Chen, Hsinchun, "Machine Learning for Information Retrievel: Neural Networks, Symbolic Learning, and Genetic Algorithms", Journal of the American society for Information Science, 1995 46(3): pp. 195-216.
Lopez-Pujalte, Cristine et al., "A Test of Genetic Algorithms in Relevance Feedback", Information Processing Management, 2001, 13 pages.
Owais et al., "Evolutionary Learning of Boolean Queries by Genetic Programming," Conference of Advances in Databases and Information Systems, 2005:54-65.
Takagi, Hideyuki, "Interactive evolutionary computation: fusion of the capabilities of EC optimization and human evaluation." Proc. IEEE 89: 1-23.
Yang et al., "Query Improvement in Information Retrieval Using Genetic Algorithms—A Report on the Experiments of the TREC Project," TREC Book, 1992:31-58. (Accessed online at <http://trec.nist.gov/pubs/trec1/papers/03.txt> on Jul. 3, 2011.).
International Search Report and Written Opinion for International Application No. PCT/US06/038134, mailed Jun. 16, 2008.
International Search Report for International Application No. PCT/US04/009965, mailed Jul. 6, 2005.
International Search Report for International Application No. PCT/US04/028038, mailed Apr. 25, 2007.
International Search Report for International Application No. PCT/US05/023884, mailed Dec. 12, 2005.
Supplementary European Search Report for Application No. EP 06 81 5835, dated Sep. 4, 2009.
Non-final office action in U.S. Appl. No. 10/815,321, mailed Sep. 23, 2005.
Non-final office action in U.S. Appl. No. 10/903,621, mailed May 31, 2007.
Non-final office action in U.S. Appl. No. 10/903,621, mailed Sep. 20, 2006.
Non-final office action in U.S. Appl. No. 11/176,968, mailed Aug. 3, 2009.
Non-final office action in U.S. Appl. No. 11/176,968, mailed Jan. 28, 2008.
Non-final office action in U.S. Appl. No. 11/176,968, mailed Jul. 13, 2011.
Non-final office action in U.S. Appl. No. 11/176,968, mailed May 6, 2010.
Non-final office action in U.S. Appl. No. 11/382,180, mailed May 28, 2008.
Non-final office action in U.S. Appl. No. 11/534,035, mailed Jan. 4, 2011.
Non-final office action in U.S. Appl. No. 11/534,035, mailed May 28, 2009.
Non-final office action in U.S. Appl. No. 11/768,460, mailed Aug. 30, 2011.
Non-final office action in U.S. Appl. No. 11/768,460, mailed Mar. 15, 2010.
Non-final office action in U.S. Appl. No. 12/014,490, mailed Nov. 19, 2009.
Non-final office action in U.S. Appl. No. 12/578,395, mailed Jul. 18, 2011.
Non-final office action in U.S. Appl. No. 12/766,450, mailed Jul. 8, 2011.
Non-final office action in U.S. Appl. No. 12/766,450, mailed Sep. 29, 2010.
Non-final office action in U.S. Appl. No. 13/014,215, mailed Apr. 21, 2011.
Final office action in U.S. Appl. No. 11/176,968, mailed Dec. 3, 2008.
Final office action in U.S. Appl. No. 11/176,968, mailed Jan. 5, 2011.
Final office action in U.S. Appl. No. 11/534,035, mailed Feb. 22, 2010.
Final office action in U.S. Appl. No. 11/768,460, mailed Nov. 26, 2010.
Final office action in U.S. Appl. No. 11/534,035, mailed Sep. 6, 2011.
Final office action in U.S. Appl. No. 11/176,968, mailed Oct. 26, 2011.
Final office action in U.S. Appl. No. 12/766,450, mailed Oct. 26, 2011.
Notice of allowance in U.S. Appl. No. 10/815,321, mailed Dec. 14, 2005.
Notice of allowance in U.S. Appl. No. 10/903,621, mailed Sep. 25, 2007.
Notice of allowance in U.S. Appl. No. 11/382,180, mailed Jun. 17, 2009.
Notice of allowance in U.S. Appl. No. 11/537,143, mailed Dec. 17, 2009.
Notice of allowance in U.S. Appl. No. 12/014,490, mailed Nov. 3, 2010.
Notice of allowance in U.S. Appl. No. 13/014,215, mailed Oct. 24, 2011.
Notice of allowance in U.S. Appl. No. 12/578,395, mailed Nov. 3, 2011.
Interview summary in U.S. Appl. No. 10/815,321, mailed Dec. 14, 2005.
Interview summary in U.S. Appl. No. 10/815,321, mailed Mar. 21, 2005.
Interview summary in U.S. Appl. No. 10/903,621, mailed May 31, 2007.
Interview summary in U.S. Appl. No. 10/922,777, mailed Jul. 16, 2007.
Interview summary in U.S. Appl. No. 10/922,777, mailed Apr. 19, 2007.
Interview summary in U.S. Appl. No. 10/922,777, mailed Apr. 9, 2007.
Interview summary in U.S. Appl. No. 11/846,267, mailed Dec. 5, 2008.
Miki, et a., "Proceedings of the 16th Annual Conference of Japanese Society for Artificial Intelligence," 2002. (English Abstract included).

Bäck, Thomas, et al., "Handbook of Evolutionary Computation," 1997, Publishing Ltd. and Oxford University Press, p. 14, lines 15-16. (*A1.3 Advantages (and disadvantages) of evolutionary computation over other approaches*).

Baeza-Yates R., et al: "Modern Information Retrieval, Chapter 5: Query Operations" Modern Information Retrieval, Harlow: Addison-Wesley, GB, 1999, pp. 117-139, XP002311981, ISBN: 0-201-39829-X.

Banks, Jerry, "Discrete-Event System Simulation," Second Edition, 1996, Prentice-Hall, Upper Saddle River, New Jersey, p. 3-55, *1 Introduction to Simulation*.

Banks, Jerry, "Handbook of Simulation: Principles, Methodology, Advances, Applications, and Practice," 1998, John Wiley & Sons, Inc., New York, New York. p. 15, line 15-22, *1.7 Steps in a Simulation Study*.

Banzhaf, Wolfgang, et al., "Genetic Programming: An Introduction on the Automatic Evolution of Computer Programs and Its Applications," 1998, Morgan Kaufmann Publishers, Inc., San Francisco, California, p. 14, *1 Genetic Programming as Machine Learning*.

Beasley D, et al.: "An Introduction to Genetic Algorithms", Vivek, National Centre for Softwre Technology, Bombay, In, vol. 7, No. 1, pp. 3-19, XPoo1061908, ISSN: 0970-8618.

Cortinas, Marty; "HPS to remodel Ithink simulator." (High Performance Systems Inc's Ithink 5.0 business-modeling, simulation software) (Product Announcement). MacWEEK, v11, n26, p29(2), Jul. 7, 1997.

Ferber, Jacques, "Multi-Agent Systems: An Introduction to Distributed Artificial Intelligence," 1999, Addison Wesley Longman Limited, Harlow, Essex, England, p. 1-48, *1 Principles of Multi-Agent Systems*.

Michalewicz, Zbigniew, "Genetic Algorithms + Data Structures = Evolution Programs," Third, Revised and Extended Edition, 1996, Springer-Verlag Berlin Heidelberg, p. 13-31, *GAs: What Are They?*.

Micro Saint 3.2 (278548); Micro Analysis & Design Inc., 4900 Pearl East Cir. #201E, Boulder, CO 80301, Jan. 1986.

Moss, Scott, et al., "Lecture Notes in Artificial Intelligence: Subseries of Lecture Notes in Computer Science: Multi-Agent-Based Simulation," Second International Workshop, MABS 2000, Boston, Massachusetts, July, Revised and Additional Papers, Springer-Verlag Berlin Heidelberg, p. 1-26, *Editorial Introduction: Messy Systems—The Target for Multi Agent Based Simulation*.

Srinivas, M., et al.: "Genetic Algorithms: A Survey" Computer, IEEE Service Center, Los Alamitos, CA, US, vol. 27, No. 6, Jun. 1, 1994, pp. 17-26, XP000438318, ISSN: 0018-9162.

Valenzuela, Christine L., "A Simple Evoluntionary Algorithm for Multi-Objective Optimization (SEAMO)," Evolutionary Computation, 2002, 1:717-722 (2002).

Van Veldhuizen, David A., "Issues in Parallelizing Multiobjective Evolutionary Algorithms for Real World Applications," Proceedings of the 17th Symposium on Proceedings of the 2002 ACM Symposium on applied computing, Mar. 2002, pp. 595-602.

Zeigler, Bernard P., et al., "Theory of Modeling Simulation, Second Edition, Integrating Discrete Event and Continuous Complex Dynamic Systems," 2000, Academic Press, San Diego, California, p. 3-53, *1 Introduction to Systems Modeling Concepts*.

* cited by examiner

SYSTEM AND METHOD FOR AIDING PRODUCT DESIGN AND QUANTIFYING ACCEPTANCE

REFERENCE TO RELATED APPLICATIONS

This application claims the right of priority to U.S. Provisional Application No. 60/719,024, filed Sep. 21, 2005, which is hereby incorporated herein by reference.

BACKGROUND

This invention relates to methods and systems for describing the attributes of a product, developing models of the product attributes, and utilizing feedback to modify the design of the product.

Designers of a product, including but not limited to a consumer product such as a perfume, may describe the attributes of the product using a large number and variety of descriptors. That is, using perfume as the example, designers may describe a particular perfume as having various degrees of floral, citrus, fruity, and other characteristics. Existing products (e.g., perfumes) may have known profiles or descriptions. However, it may be difficult for the product designer in designing a new product to predict what combination of attributes (e.g., floralness, citrusness, fruitiness, ...) may win high acceptance from consumers or potential customers.

To achieve the objective of mapping acceptability to the consumer or potential customer of different combinations of characteristics in the context of a product, establishing a structured description of the product attribute space may be helpful. That may be true in order to provide product designers with meaningful and actionable feedback as to how a new product could be made more acceptable.

Continuing with the perfume example for concreteness, to be able to tell the perfumer to design a perfume that goes in the direction of perfume A or that is close to perfume C, or that consumer acceptance changes substantially over a small distance, notions of direction and distance should exist. Such notions may not be clearly and unambiguously extractable from the way perfumers describe perfumes, however. Hence, methods and systems that provide a structured quantitative approach may be desirable.

SUMMARY

Disclosed herein are methods and systems for designing a new product, comprising: having rated a first plurality of existing products in a product field according to a second plurality of product attributes; assigning each of the first plurality of existing products a location in a space having the second plurality of dimensions, according to the existing product's ratings with respect to the second plurality of product attributes; locating the first plurality of existing products in a space of a third plurality of dimensions; choosing a fourth plurality of reference products which sample the space of the third plurality of dimensions, from among the first plurality of existing products; having conducted a consumer survey of the fourth plurality of reference products; creating a map of consumer responses in the space of the third plurality of dimensions; and designing the new product based upon the map of consumer responses.

In some embodiments, the product field may be perfumes.

In some embodiments, each rating of one of the first plurality of existing products according to one of the second plurality of product attributes may be a number from 0 to 1. In some embodiments, the second plurality of ratings of each of the first plurality of existing products according to the second plurality of product attributes may be normalized.

In some embodiments, the first plurality of products may be located in the space of the third plurality of dimensions using multidimensional scaling. In some embodiments, the first plurality of products may be located in the space of the third plurality of dimensions using multidimensional scaling and interactive evolutionary computing.

In some embodiments, the fourth plurality of reference products which sample the space of the third plurality of dimensions may be chosen from among the first plurality of existing products using bootstrapping.

In some embodiments, the consumer survey may comprise obtaining information about at least one demographic variable of a plurality of surveyed consumers.

In some embodiments, the map of consumer responses may comprise a map of consumer ratings of one characteristic of the fourth plurality of reference products. In some embodiments, the one characteristic may be consumer acceptance of the product.

In some embodiments, the map of consumer ratings of one characteristic of the fourth plurality of reference products may be created by using a graphical method. In some embodiments, the graphical method may be a neural network. In some embodiments, the map of consumer ratings of one characteristic of the fourth plurality of reference products may be created by using a genetic algorithm.

Some embodiments may further comprise designing the new product based upon the map by locating an unpopulated region in the space of the third plurality of dimensions, wherein a consumer rating of the one characteristic is predicted by the map to be high, and locating a corresponding region in the space having the second plurality of dimensions. Some embodiments may further comprise locating the corresponding region in the space having the second plurality of dimensions by using multidimensional scaling. Some embodiments may further comprise locating the corresponding region in the space having the second plurality of dimensions by using multidimensional scaling and a genetic algorithm.

Some embodiments may further comprise designing the new product based upon the map by selecting an initial design comprising values for the new product with respect to each of the second plurality of product attributes; locating the initial design in the space of the third plurality of dimensions; finding a location in the space of the third plurality of dimensions which is in a vicinity of the initial design and which is predicted by the map to have a greater value of the consumer rating of a desired product characteristic than the initial design; and finding a corresponding location in the space having the second plurality of dimensions. Some embodiments may further comprise locating the initial design in the space of the third plurality of dimensions by means of multidimensional scaling. Some embodiments may further comprise locating the initial design in the space of the third plurality of dimensions by means of interpolation. Some embodiments may further comprise finding the location in the space of the third plurality of dimensions which is in the vicinity of the initial design and which is predicted by the map to have the greater value of the consumer rating of the desired product characteristic by means of a gradient ascending algorithm. Some embodiment may further comprise finding the location in the space of the third plurality of dimensions which is in the vicinity of the initial design and which is predicted by the map to have the greater value of the consumer rating of the desired product characteristic by means of a genetic algorithm. Some embodiments may further comprise locating the corresponding location in the space having the second plurality of dimensions by using multidimensional scaling. Some embodiments may further comprise locating the corresponding location in the space having the second plurality of dimensions by using multidimensional scaling and a genetic algorithm.

In some embodiments, the map of consumer responses may comprise a map of consumer ratings of a plurality of characteristics of the fourth plurality of reference products. Some embodiments may further comprise generating a map of consumer ratings of the plurality of characteristics of the fourth plurality of reference products in the space of a second plurality of dimensions based upon the map of consumer ratings of the plurality of characteristics of the fourth plurality of reference products in the space of the third plurality of dimensions.

BRIEF DESCRIPTION OF THE DRAWINGS

These and other features and advantages of the methods and systems disclosed herein will be more fully understood by reference to the following detailed description, in conjunction with the attached drawings.

DETAILED DESCRIPTION OF EXEMPLARY EMBODIMENTS

To provide an overall understanding, certain illustrative embodiments will now be described; however, it will be understood by one of ordinary skill in the art that the devices and methods described herein can be adapted and modified to provide devices and methods for other suitable applications and that other additions and modifications can be made without departing from the scope of the devices and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, specified, interchanged, and/or rearranged without departing from the disclosed devices or methods.

Although the embodiments of the present invention which are described herein are described as applied in the context of perfume, they extend to modeling and designing other sensory experiences (flavors, textures, etc, and combinations thereof) and products, and to characteristics determined by other senses (e.g., sight, sound, taste, touch) and combinations of senses, besides smell alone.

The features of the methods and systems disclosed herein may be understood with reference to exemplary applications. Discussed herein are applications to perfumes, but the use of perfume is intended solely as an example, and the methods and systems are not so limited.

Figure 1:
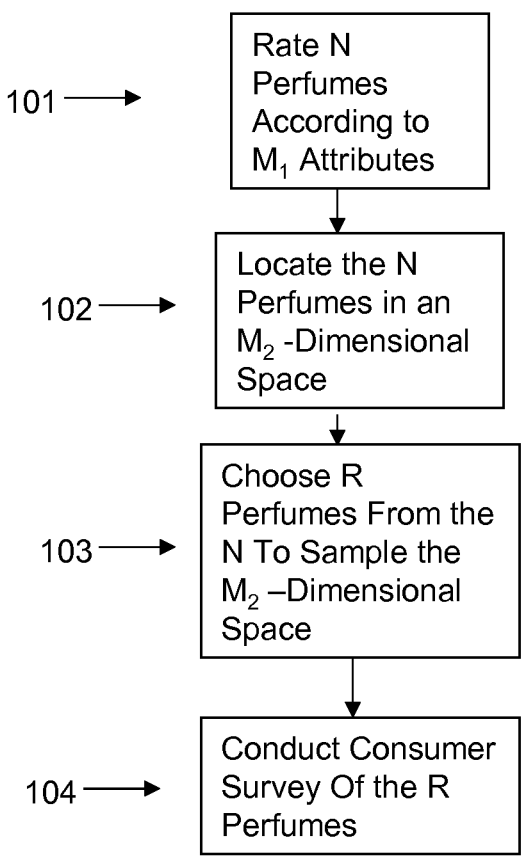
FIG. 1 is a flow chart of certain steps in one or more embodiments of a method disclosed herein.

In order to provide a more rigorous and structured understanding of consumer preferences with respect to perfumes, and a system and method for exploiting that understanding to design new perfumes, one may begin as shown in FIG. 1 to model perfumer space. Perfumers have a vocabulary of attributes by which they may describe the characteristics of perfumes. One may choose a set of $M_1$ such attributes, and in step 101 obtain ratings of N existing perfumes with respect to those $M_1$ attributes. That is, each existing perfume $P_i$ may be described by a subset of $M_1$ values, where value $M_{ij}$ describes the extent to which perfume i has characteristic j, and j runs from 1 to $M_1$. In one embodiment, the values of $M_{ij}$ may be restricted to a range from 0 to 1, but that is not required; they may be restricted to other ranges or unrestricted. In another embodiment, the values of $M_{ij}$ may be normalized so that they sum to a given value, such as 1, for each perfume $P_i$, but that is not required. The resulting sets of values may be thought of as representing points in an $M_1$-dimensional space. That is, each perfume may be located at a particular position in that space, corresponding to the numerical value assigned to that perfume with respect to each of the $M_1$ attributes, which correspond to the dimensions in this space. For example, perfume j might be 0.8 floral-rosy and 0.2 floral-muguet, where floral-rosy and floral-muguet are two attributes of perfumes. (Of course, as described above the values need not sum to 1.)

One might be able to extract additional information from a hierarchical description of characteristics (for example, floral, citrus, fruity, green, woody, musky and herbal might have sub-categories). Such an approach by itself might not be satisfactory, however. First, it is unlikely that a conventional Euclidean distance function between two perfumes' characterizations, such as $$dij = \left[\sum_{k=1}^{M1} |M_{ik} - M_{jk}|^2\right]^{1/2},$$

where i and j are two perfumes, would reflect the true structure of perfumer space. Second, the number $M_1$ corresponding to the number of attributes by which perfumers rate perfumes is too large; a smaller number of dimensions is required in order to adequately sample or cover the space with a set of reference perfumes.

Accordingly, at step 102 the perfumes are located in a new abstract $M_2$ dimensional space, where $M_2$ is substantially smaller than $M_1$. ($M_1$ may be of the order of 100, but may be substantially larger, such as 500 or 1000, while $M_2$ may be in the range of 5 to 20, with 10 a convenient but not required choice.) A range of statistical techniques can be used to reduce the number of dimensions in a meaningful way, and locate the N perfumes in the reduced-dimension space. One approach is a combination of multidimensional scaling (MDS) (Cox, T. F. & Cox, M. A. A. 1994. *Multidimensional Scaling*. Chapman and Hall, London; Jain, A. K. & Dubes, R. C. 1988. *Algorithms for Clustering Data*. Prentice Hall, Englewood Cliffs, N.J.; Hand, D., Mannila, H. & Smyth, P. 2001. *Principles of Data Mining*. MIT Press, Cambridge, Mass.) and interactive evolutionary computation (IEC) (Takagi, H. 2001. Interactive evolutionary computation: fusion of the capabilities of EC optimization and human evaluation. *Proc. IEEE* 89: 1275-1296). Other methods may also be used, however.

In particular, the following procedure may be used to define a new $M_2$-dimensional space and locate the N perfumes in that space. Initially, there is no distance function by which the distance between two perfumes in the $M_1$-dimensional space may be determined. Accordingly, a small number of distance functions may be arbitrarily chosen. For example, distance functions of the form:

$$d_{ij} = \left[\sum_{k=1}^{M1} O_k |M_{ik} - M_{jk}|^{\alpha_k}\right]^{\frac{M1}{M}} \sum_{k=1}^{M1} \alpha_k$$

may be chosen, where i and j are two perfumes, $O_k$ is a weight along dimension k and $a_k$ is the distance exponent along dimension k. For example, if $O_k=1$ for all k, and $a_k=2$ for all k, the Euclidean distance in $M_1$ dimensions results. The initial distance functions may be chosen by variation from the Euclidean distance function, but that is not required. Distance functions in other forms than that set forth above may be chosen as well, or alternatively. Initial distance functions may also be chosen based on experience with prior results.

Multi-dimensional scaling (MDS) then may be used to generate projections of the N perfumes from the $M_1$-dimensional space into a two-dimensional space, based on the arbitrarily-chosen distance functions. The MDS algorithm minimizes the difference between the distance functions for pairs of perfumes in the $M_1$-dimensional space and in the two-dimensional space. (MDS is a powerful technique that can, for example, reconstruct accurate maps of a country based solely on a subset of intercity distances.) Then, a perfumer may choose the two-dimensional projections which best place perfumes which the perfumer judges to be similar near each other; the perfumer may look at perfume clusters and decide in which of the MDS-generated projections the similarities and dissimilarities between perfumes best "make sense" (using and leveraging the perfumer's subjective judgment).

Based on these choices, IEC may be used to generate new distance functions in the $M_1$-dimensional space based on the distance functions used in the MDS algorithm and the perfumer ratings of the resulting two-dimensional projections. That is, new distance functions may be generated for the next iteration of MDS by the application of genetic operations on the distance functions from the prior iteration, taking into account the perfumer's evaluation of which distance functions yielded the "best" results. The parameters to be evolved using IEC can be $O_k$ and $a_k$, if the above exemplary form for the distance function is used. For descriptions of IEC based on input from a user, see U.S. Pat. No. 7,043,463, Methods and Systems for Interactive Evolutionary Computing (IEC), Bonabeau, et al., inventors, issued May 9, 2006, and U.S. Published Patent Application 2005/0118612 A1, Methods and Systems for Applying Genetic Operators to Determine System Conditions, Bonabeau, et al., inventors, published Jun. 2, 2005, the contents of which are incorporated herein by reference.

This process may be continued until the perfumer concludes that a two-dimensional projection is sufficiently accurate, or until the change between iterations falls below a desired cutoff, or until any other suitable cutoff is reached.

Then, the N perfumes may be located in the $M_2$-dimensional space, using the distance function for $M_1$-space selected by the above method, by again using an MDS algorithm and that distance function (or by other appropriate means).

The outputs of this phase include:
  A small set of (perhaps 10) dimensions in which perfumes can be compared.
  Significant, quantitatively documented insight into the true topological structure of the space of perfumistic descriptions.

With the N perfumes now located in an $M_2$-dimensional space, the next step 103 may be to choose a reference set of R perfumes from among the N to adequately sample the $M_2$-dimensional space. The value of R may be chosen in order to provide adequate coverage while making the survey to follow practicable. A convenient range for R may be 10 to 50, but R is not limited to that range.

A variety of statistical techniques may be used to select the R perfumes in $M_2$-dimensional space from among the N perfumes. These techniques will be known to a person of skill in the art; bootstrapping is an exemplary technique, but the method is not limited to the use of that technique.

Following the selection of the R reference perfumes, at step 104 traditional perfume surveys are designed and run. One may ask consumers to rate/rank perfumes, do pair-wise comparisons, describe the perfumes with a set of words (which may be restricted to a predetermined list), or evaluate certain specified qualities such as freshness, etc. The decisions as to which approach (or combination of approaches) to use may be made based upon the modeling framework and the nature of the acceptance maps one wishes to construct. In addition, to build into the mapping process an ability to understand differences in acceptance between difference demographic groups, such as but not limited to older (for example, 55+) and younger consumers, one may collect data about the demographic characteristics of the responders (and perhaps design the survey to obtain responses from appropriate numbers of members of differing demographic groups). Demographic variables may include (but are not limited to) age, gender, racial or ethnic group, religion, sexual preference, educational level, income, and residence location.

Figure 2:
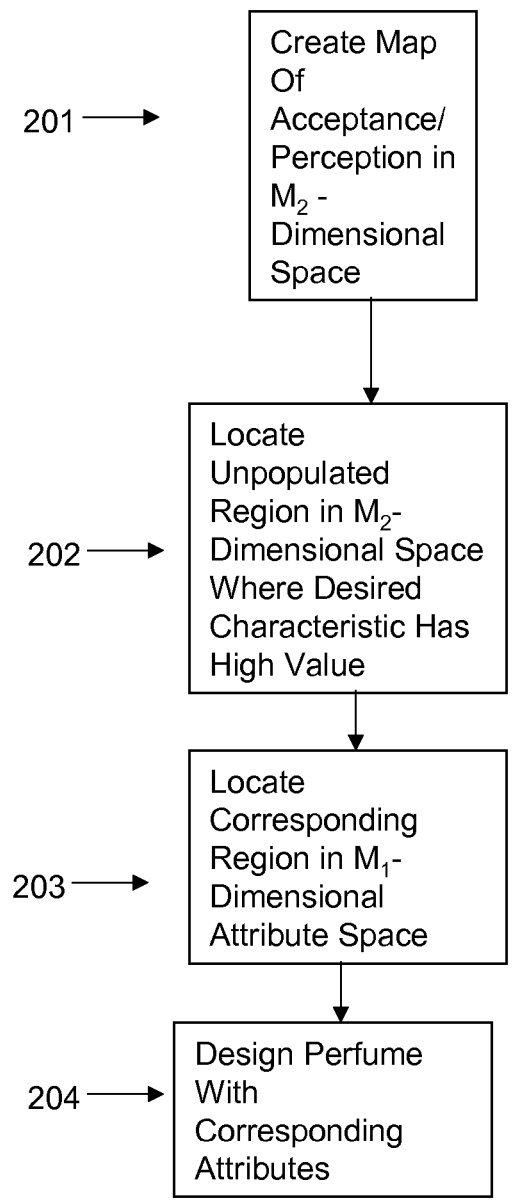
FIG. 2 is a flow chart of certain steps in one or more embodiments of a method disclosed herein.
Figure 3:
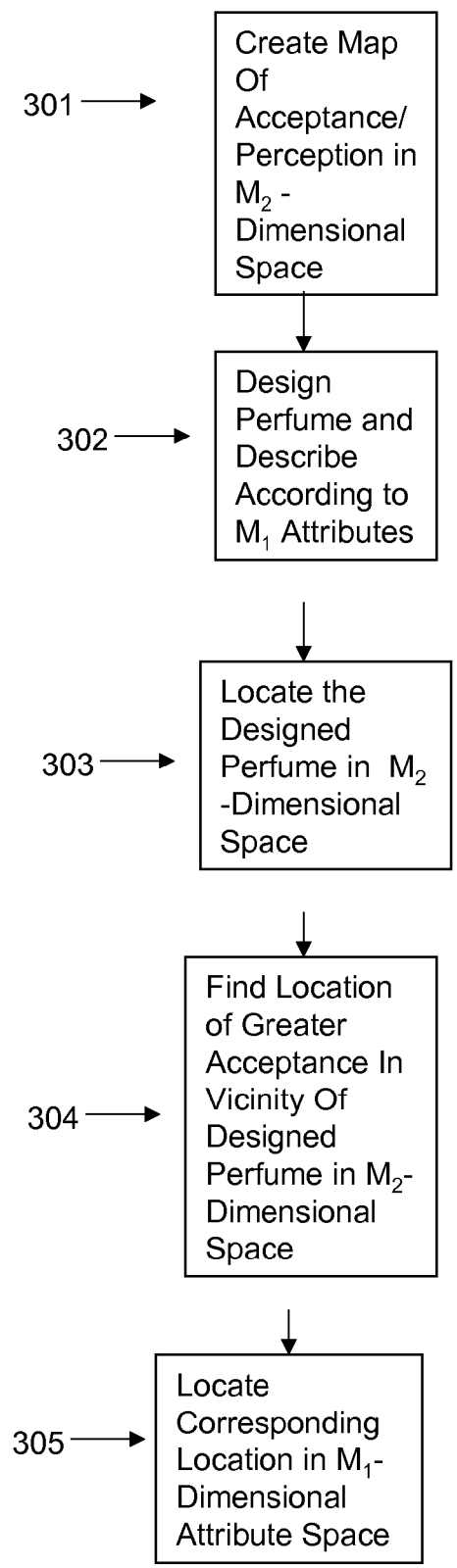
FIG. 3 is a flow chart of certain steps in one or more embodiments of a method disclosed herein.

Following the completion of the consumer surveys at step 104, one may then proceed as shown in FIGS. 2, 3 and/or 4 to conduct analysis and development of new perfumes based on the results of the survey.

Thanks to the prior steps, one has a structured, low-dimensional space of perfumer descriptions (the space with $M_2$ dimensions) which can be used to map consumer acceptance to perfume characteristics. A variety of techniques can be used, including but not limited to statistical machine learning techniques such as neural networks and other graphical models known to persons of skill in the art. The appropriate technique may be selected as a function of the nature of the landscape of the data, and the results desired. The outputs of this stage may include:
  A mapping from perfumer descriptions to consumer acceptance.
  A predictive tool which can take any perfumer description (consistent with the descriptions previously used) and predict consumer acceptability.
  A gradient map of consumer acceptability that indicates regions of rapid change.
  A map of regions of potentially high acceptance that appear to be poorly covered by existing perfumes.

In particular, referring to FIG. 2, if the consumer survey has included questions designed to elicit a response with respect to each of the R perfumes that may be characterized as approval/disapproval, or a response that rates the R perfumes on a specific characteristic, and if it is desired to find a region of potentially high acceptance (or of high values of the specific characteristic) that appears to be poorly covered by existing perfumes, one may begin at step 201 by creating a map of consumer acceptance (or the value of the specific characteristic) in the $M_2$-dimensional space, based on the consumer acceptance of the R reference perfumes in that space.

This map may be created by a variety of techniques known to a person of skill in the art, including but not limited to a variety of error-minimizing machine learning techniques. This may be a neural network or other graphical model, or it may be a genetic algorithm, but the range of possible techniques are not limited to these options. If a genetic algorithm is used, for example, one may begin with arbitrary acceptance functions in the $M_2$-dimensional space, calculate the error for each function in predicting the consumer acceptance of the R reference perfumes, generate a new set of acceptance functions based on those errors and the prior acceptance functions, using a genetic algorithm, and continue until an acceptably low error is obtained, until the change in error from one iteration to the next is below a cutoff level, or until another appropriate cutoff is reached.

After the map is created at step 201, one may proceed to step 202 and search the $M_2$-dimensional space for a region where the acceptance function is high, but where none of the existing N perfumes are located. Methods of doing so will be known to a person of skill in the art. When a location in the $M_2$-dimensional space is found at step 202 with a suitably high consumer acceptance that is suitably remote from other perfumes, the corresponding location in the $M_1$-dimensional attribute space may be located at step 203.

A variety of techniques may be used to locate the point in $M_1$-dimensional attribute space that corresponds to the desired point in the $M_2$-dimensional space. For example, and not by way of limitation, one may start with arbitrary points in the $M_1$-dimensional space, use the MDS algorithm with the previously-determined distance function for the $M_1$-dimensional space to locate these points in $M_2$-dimensional space, and then use a genetic technique such as described above to choose new points in the $M_1$-dimensional space based on the relative closeness of the resulting points in $M_2$-dimensional space to the desired location in $M_2$-dimensional space. This process may continue until it is determined that a point in $M_1$-dimensional space corresponds to a point in $M_2$-dimensional space that is sufficiently close to the desired point in $M_2$-dimensional space, or until another suitable cutoff is reached. The resulting point in $M_1$-dimensional space then may be used as the description of the attributes of the desired new perfume, or may be taken into consideration together with other information in determining the attributes of the desired new perfume.

Alternative methods may also be used to minimize the error in the $M_2$-dimensional space.

Referring to FIG. 3, it is also possible to use the consumer survey results in other ways to help design new perfumes. In one such way, again if the consumer survey has included questions designed to elicit a response with respect to each of the R perfumes that may be characterized as approval/disapproval, or a response that rates the R perfumes on a specific characteristic, one may begin at step 301, as at step 201, by creating a map of consumer acceptance in the $M_2$-dimensional space, based on the consumer acceptance of the R reference perfumes in that space. Following the creation of that map, one may alternatively design a new perfume as follows. One may start by tentatively describing a potential new perfume according to its characteristics in $M_1$-dimensional attribute space at step 302. One may then project that point into the $M_2$-dimensional space at step 303. This may be done using the previously-generated distance function for the $M_1$-dimensional space, by running the MDS algorithm again, by interpolation methods using the nearest neighbors of the proposed perfume in $M_1$-dimensional space, or by other methods known to those of skill in the art.

Having located the proposed perfume in $M_2$-dimensional space at step 303, one may proceed at step 304 to find a location or region of greater acceptance in the near vicinity of the proposed perfume in $M_2$-dimensional space, using the map of acceptance generated at step 301. One may determine this location of greater acceptance by methods such as but not limited to using a gradient ascent algorithm, which may but need not be a genetic algorithm. Other methods will also be known to a person of skill in the art.

Finally, having determined the location of greater acceptance in the $M_2$-dimensional space, one may project that back at step 305 into the $M_1$-dimension attribute space, using techniques such as (but not limited to) those described above at step 203.

Thus, by these methods the map built at step 301 can be used to generate feedback to the perfumer. Referring to FIG. 3, the system may work as follows:

1. Perfumer creates perfume and describes it using words.
2. Perfume is located in perfumer description space at step 302.
3. Acceptance level is determined using the mapping function learned or evolved in step 301, after the perfume is located in the $M_2$-dimensional space at step 303.
4. A gradient ascent algorithm is applied at step 304 to identify neighboring peaks of acceptance.
5. Peaks of acceptance are reverse-mapped onto perfumer description space at step 305 for identification of perfume that would be close to the one the perfumer designed but with higher acceptance.

The output of this stage comprises a tool that provides meaningful feedback to the perfumer.

It will be understood that while the above methods and systems were described in FIGS. 2 and 3 with respect to surveys of perfume acceptance, and designing new perfumes with high levels of acceptance, the same methods and systems may be used with surveys that measure consumer descriptions of perfumes with respect to a particular desired characteristic, such as "freshness," and then seek to design a new perfume with a high degree of that characteristic.

Figure 4:
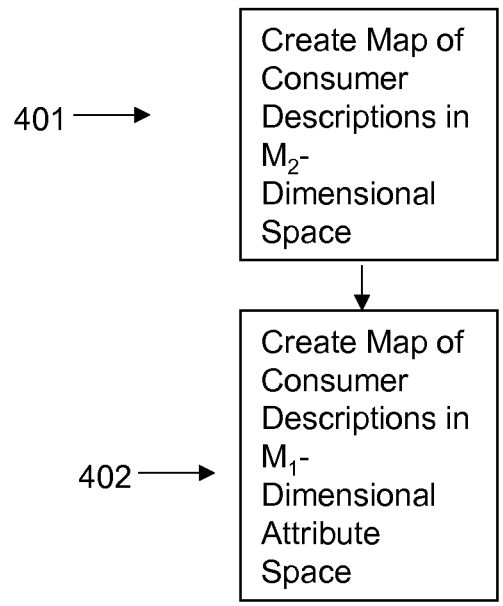
FIG. 4 is a flow chart of certain steps in one or more embodiments of a method disclosed herein.

Referring to FIG. 4, additional means to exploit the consumer survey results also may be utilized. In the case where consumers have been surveyed with respect to a plurality of descriptions of the R reference perfumes, methods may be utilized at step 401 to create maps of the consumer descriptions in the $M_2$-dimensional space, by empirical methods similar (but not limited) to those used at steps 201 and 301 to create maps of single characteristics. Then, at step 402 a reverse map may be created to project the consumer characteristics into the $M_1$-dimensional space, using (but not limited to) techniques similar to those described above. This map then may, for example, enable a perfumer to determine, without conducting a new consumer survey, the anticipated consumer reaction to a perfume with specific characteristics as described in $M_1$-dimensional attribute space.

Insofar as methods and systems described herein are implemented using hardware and/or software, they are not limited to a particular hardware or software configuration, and may find applicability in many computing or processing environments. The methods and systems can be implemented in whole or in part in hardware or software, or a combination of hardware and software. The methods and systems can be implemented in whole or in part in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include but are not limited to one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

Computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

As is known in the art, input to a processor-controlled device can be provided in a variety of manners, including selection via a computer mouse, joystick, keyboard, touchpad, stylus, voice and/or audio command, and other available means for providing an input to a processor-controlled device.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet References herein to microprocessor instructions or microprocessor-executable instructions, in accordance with the above, can be understood to include programmable hardware.

Although the methods and systems have been described relative to specific embodiments thereof, they are not so limited. Obviously many modifications and variations may become apparent in light of the above teachings.

While the systems and methods disclosed herein have been particularly shown and described with references to exemplary embodiments thereof, it will be understood by those skilled in the art that various changes in form and details may be made therein without departing from the spirit and scope of the disclosure. Those skilled in the art will recognize or be able to ascertain using no more than routine experimentation, many equivalents to the exemplary embodiments described specifically herein. Such equivalents are intended to be encompassed in the scope of the present disclosure.

What is claimed is:

1. In a computer system comprising at least one input device, at least one output device, and at least one processor, a method for designing a new product, comprising:
   a) receiving through the at least one input device ratings of a first plurality of existing products in a product field according to a second plurality of attributes;
   b) assigning in the at least one processor each of said first plurality of existing products a location in a first space having said second plurality of dimensions, according to said existing product's ratings with respect to said second plurality of attributes;
   c) locating said first plurality of existing products in a second space of a third plurality of dimensions using multidimensional scaling;
   d) choosing a fourth plurality of reference products which sample said second space of said third plurality of dimensions, from among said first plurality of existing products;
   e) receiving through the at least one input device consumer responses to a consumer survey concerning said fourth plurality of reference products;
   f) creating in the at least one processor a map of consumer responses in said second space of said third plurality of dimensions;
   g) based on said map of consumer responses in said second space of said third plurality of dimensions, finding by means of the at least one processor at least one desirable location in said first space having said second plurality of dimensions; and
   h) outputting through the at least one output device an identification of said at least one desirable location, whereby said new product is designed based upon said map of consumer responses;
   wherein said second plurality of dimensions is equal in quantity to said second plurality of attributes and greater in quantity than said third plurality of dimensions.

2. The method of claim 1, wherein the product field is perfumes.

3. The method of claim 1, wherein each rating of one of said first plurality of existing products according to one of said second plurality of attributes of said existing product is a number from 0 to 1.

4. The method of claim 1, wherein said second plurality of ratings of each of said first plurality of existing products according to said second plurality of attributes of said existing product are normalized.

5. The method of claim 1, wherein the step of locating said first plurality of existing products in said second space of said third plurality of dimensions further comprises using interactive evolutionary computing.

6. The method of claim 1, wherein said fourth plurality of reference products which sample said second space of said third plurality of dimensions is chosen from among said first plurality of existing products using bootstrapping.

7. The method of claim 1, wherein said consumer survey comprises information about at least one demographic variable of a plurality of surveyed consumers.

8. The method of claim 1, wherein said map of consumer responses comprises a map of consumer ratings of one characteristic of said fourth plurality of reference products.

9. The method of claim 8, wherein said one characteristic is consumer acceptance of said reference products.

10. The method of claim 8, wherein said map of consumer ratings of one characteristic of said fourth plurality of reference products is created by using a graphical method.

11. The method of claim 10, wherein the graphical method is a neural network.

12. The method of claim 8, wherein said map of consumer ratings of one characteristic of said fourth plurality of reference products is created by using a genetic algorithm.

13. The method of claim 8, wherein said step of finding at least one desirable location in said first space having said second plurality of dimensions comprises:
 a) locating an unpopulated region in said second space of said third plurality of dimensions, wherein a consumer rating of said one characteristic is predicted by said map to be high, and
 b) locating a corresponding region in said first space having said second plurality of dimensions.

14. The method of claim 13, wherein said step of locating said corresponding region in said first space having said second plurality of dimensions comprises using multidimensional scaling.

15. The method of claim 14, wherein said step of locating said corresponding region in said first space having said second plurality of dimensions further comprises using a genetic algorithm.

16. The method of claim 8, wherein said step of finding at least one desirable location in said first space having said second plurality of dimensions comprises:
 a) receiving by means of the at least one input device an initial design for said new product comprising values for said new product with respect to each of said second plurality of product attributes;
 b) locating said initial design in said second space of said third plurality of dimensions;
 c) finding a location in said second space of said third plurality of dimensions which is in a vicinity of said initial design and which is predicted by said map to have a greater value of said consumer rating of a desired product characteristic than said initial design; and
 d) finding a corresponding location in said first space having said second plurality of dimensions.

17. The method of claim 16, wherein the step of locating said initial design in said second space of said third plurality of dimensions comprises using-multidimensional scaling.

18. The method of claim 16, wherein the step of locating said initial design in said second space of said third plurality of dimensions comprises using interpolation.

19. The method of claim 16, further wherein the step of finding said location in said second space of said third plurality of dimensions which is in said vicinity of said initial design and which is predicted by said map to have said greater value of said consumer rating of said desired product characteristic comprises using a gradient ascending algorithm.

20. The method of claim 19, wherein the step of finding said location in said second space of said third plurality of dimensions which is in said vicinity of said initial design and which is predicted by said map to have said greater value of said consumer rating of said desired product characteristic comprises using a genetic algorithm.

21. The method of claim 16, wherein the step of locating said corresponding location in said first space having said second plurality of dimensions comprises using multidimensional scaling.

22. The method of claim 21, wherein the step of locating said corresponding location in said first space having said second plurality of dimensions further comprises using a genetic algorithm.

23. The method of claim 1, wherein said map of consumer responses comprises a map of consumer ratings of a plurality of characteristics of said fourth plurality of reference products.

24. The method of claim 23, further comprising generating said map of consumer ratings of said plurality of characteristics of said fourth plurality of reference products in said first space having said second plurality of dimensions based upon said map of consumer ratings of said plurality of characteristics of said fourth plurality of reference products in said second space of said third plurality of dimensions.

25. A system, comprising at least one processor in communications with at least one input device and at least one output device, the at least one processor having instructions for causing the at least one processor to:
 a) receive through the at least one input device ratings of a first plurality of existing products in a product field according to a second plurality of product attributes,
 b) assign each of said first plurality of existing products a location in a first space having said second plurality of dimensions, according to said existing product's ratings with respect to said second plurality of product attributes;
 c) locate said first plurality of existing products in a second space of a third plurality of dimensions using multidimensional scaling;
 d) choose a fourth plurality of reference products which sample said second space of said third plurality of dimensions, from among said first plurality of existing products;
 e) receive through the at least one input device consumer responses to a consumer survey concerning said fourth plurality of reference products,
 f) create in said second space of said third plurality of dimensions a map of said consumer responses to said consumer survey concerning said fourth plurality of reference products;
 g) based on said map of consumer responses in said second space of said third plurality of dimensions, find at least one desirable location in said first space having said second plurality of dimensions; and
 h) output through the at least one output device an identification of said at least one desirable location;
 wherein said second plurality of dimensions is equal in quantity to said second plurality of attributes and greater in quantity than said third plurality of dimensions.

26. The system of claim 25, wherein the product field is perfumes.

27. The system of claim 25, wherein each rating of one of said first plurality of existing products according to one of said second plurality of product attributes is a number from 0 to 1.

28. The system of claim 25, wherein said second plurality of ratings of each of said first plurality of existing products according to said second plurality of product attributes are normalized.

29. The system of claim 25, wherein the step locating said first plurality of existing products in said second space of said third plurality of dimensions further comprises using interactive evolutionary computing.

30. The system of claim 25, wherein said fourth plurality of reference products which sample said second space of said third plurality of dimensions is chosen from among said first plurality of existing products using bootstrapping.

31. The system of claim 25, wherein said consumer survey comprises information about at least one demographic variable of a plurality of surveyed consumers.

32. The system of claim 25, wherein said map of consumer responses comprises a map of consumer ratings of one characteristic of said fourth plurality of reference products.

33. The system of claim 32, wherein said one characteristic is consumer acceptance of said reference products.

34. The system of claim 32, wherein said map of consumer ratings of one characteristic of said fourth plurality of reference products is created by using a graphical method.

35. The system of claim 34, wherein the graphical method is a neural network.

36. The system of claim 32, wherein said map of consumer ratings of one characteristic of said fourth plurality of reference products is created by using a genetic algorithm.

37. The system of claim 32, wherein said step of finding at least one desirable location in said first space having said second plurality of dimensions comprises:
    a) locating an unpopulated region in said second space of said third plurality of dimensions, wherein a consumer rating of said one characteristic is predicted by said map to be high, and
    b) locating a corresponding region in said first space having said second plurality of dimensions.

38. The system of claim 37, wherein said step of locating said corresponding region in said first space having said second plurality of dimensions comprises using multidimensional scaling.

39. The system of claim 38, wherein said step of locating said corresponding region in said first space having said second plurality of dimensions further comprises using a genetic algorithm.

40. The system of claim 32, wherein said step of finding at least one desirable location in said first space having said second plurality of dimensions by comprises:
    a) receiving by means of the at least one input device an initial design for a new product comprising values for said new product with respect to each of said second plurality of product attributes;
    b) locating said initial design in said second space of said third plurality of dimensions;
    c) finding a location in said second space of said third plurality of dimensions which is in a vicinity of said initial design and which is predicted by said map to have a greater value of said consumer rating of a desired product characteristic than said initial design; and
    d) finding a corresponding location in said first space having said second plurality of dimensions.

41. The system of claim 40, wherein the step of locating said initial design in said second space of said third plurality of dimensions comprises using multidimensional scaling.

42. The system of claim 40, wherein the step of locating said initial design in said second space of said third plurality of dimensions comprises using interpolation.

43. The system of claim 40, wherein the step of finding said location in said second space of said third plurality of dimensions which is in said vicinity of said initial design and which is predicted by said map to have said greater value of said consumer rating of said desired product characteristic comprises using a gradient ascending algorithm.

44. The system of claim 43, wherein the step of finding said location in said second space of said third plurality of dimensions which is in said vicinity of said initial design and which is predicted by said map to have said greater value of said consumer rating of said desired product characteristic comprises using a genetic algorithm.

45. The system of claim 40, wherein the step of locating said corresponding location in said first space having said second plurality of dimensions comprises using multidimensional scaling.

46. The system of claim 45, wherein the step of locating said corresponding location in said first space having said second plurality of dimensions further comprises using a genetic algorithm.

47. The system of claim 25, wherein said map of consumer responses comprises a map of consumer ratings of a plurality of characteristics of said fourth plurality of reference products.

48. The system of claim 47, further comprising the at least one processor having instructions for causing the at least one processor to generate said map of consumer ratings of said plurality of characteristics of said fourth plurality of reference products in said first space having said second plurality of dimensions based upon said map of consumer ratings of said plurality of characteristics of said fourth plurality of reference products in said second space of said third plurality of dimensions.

* * * * *

UNITED STATES PATENT AND TRADEMARK OFFICE
CERTIFICATE OF CORRECTION

| | | |
|---|---|---|
| PATENT NO. | : 8,423,323 B2 | Page 1 of 1 |
| APPLICATION NO. | : 11/534035 | |
| DATED | : April 16, 2013 | |
| INVENTOR(S) | : Bonabeau | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this
Second Day of December, 2014

Michelle K. Lee
*Deputy Director of the United States Patent and Trademark Office*